(12) United States Patent
Cornelis et al.

(10) Patent No.: US 11,946,849 B2
(45) Date of Patent: Apr. 2, 2024

(54) FAST AND ROBUST FOURIER DOMAIN-BASED CELL DIFFERENTIATION

(71) Applicants: IMEC VZW, Leuven (BE); Vrije Universiteit Brussel, Brussels (BE)

(72) Inventors: Bruno Cornelis, Brussels (BE); David Blinder, Antwerp (BE); Peter Schelkens, Willebroek (BE); Bart Jansen, Mechelen (BE)

(73) Assignees: IMEC VZW, Leuven (BE); Vrije Universiteit Brussel, Brussels (BE)

( * ) Notice: Subject to any disclaimer, the term of this patent is extended or adjusted under 35 U.S.C. 154(b) by 175 days.

(21) Appl. No.: 16/957,005

(22) PCT Filed: Dec. 24, 2018

(86) PCT No.: PCT/EP2018/086837
§ 371 (c)(1),
(2) Date: Jun. 22, 2020

(87) PCT Pub. No.: WO2019/122452
PCT Pub. Date: Jun. 27, 2019

(65) Prior Publication Data
US 2020/0340908 A1 Oct. 29, 2020

(30) Foreign Application Priority Data

Dec. 22, 2017 (EP) .................................. 17210427

(51) Int. Cl.
*G01N 15/1434* (2024.01)
*G01N 15/01* (2024.01)
(Continued)

(52) U.S. Cl.
CPC ..... *G01N 15/1434* (2013.01); *G01N 15/1433* (2024.01); *G01N 15/147* (2013.01);
(Continued)

(58) Field of Classification Search
CPC .......... G01N 15/1434; G01N 15/1475; G01N 2015/008; G01N 2015/1006;
(Continued)

(56) References Cited

U.S. PATENT DOCUMENTS

| 6,411,406 B1 * | 6/2002 | Kreuzer | G03H 1/0866 |
| | | | 359/9 |
| 2004/0179738 A1 * | 9/2004 | Dai | G06T 7/001 |
| | | | 382/218 |

(Continued)

FOREIGN PATENT DOCUMENTS

| WO | 2015142923 A1 | 9/2015 |
| WO | 2015175046 A2 | 11/2015 |

(Continued)

OTHER PUBLICATIONS

M. R. Asadi, A. Vahedi and H. Amindavar, "Leukemia Cell Recognition with Zernike Moments of Holographic Images," Proceedings of the 7th Nordic Signal Processing Symposium—NORSIG 2006, 2006, pp. 214-217, doi: 10.1109/NORSIG.2006.275226. (Year: 2006).*

(Continued)

*Primary Examiner* — Siamak Harandi
*Assistant Examiner* — Daniella M. DiGuglielmo
(74) *Attorney, Agent, or Firm* — McDonnell Boehnen Hulbert & Berghoff LLP

(57) ABSTRACT

A differentiation system for differentiating cells includes an input device configured to receive holographic image data of a microscopic particle in suspension, holographic image data processing logic for converting the holographic image data to the frequency domain by performing a Fourier transform of the holographic image data, and a recognizer configured to determine characterization features of the holographic image data of the microscopic particle in the (Continued)

Fourier spectrum

Zernike polynomials

Classification frequency domain for characterization of the microscopic particle, the characterization features comprising rotationally invariant features.

16 Claims, 6 Drawing Sheets

(51) Int. Cl.
G01N 15/10 (2006.01)
G01N 15/14 (2006.01)
G01N 15/1433 (2024.01)
G01N 15/149 (2024.01)
G03H 1/00 (2006.01)
G03H 1/04 (2006.01)

(52) U.S. Cl.
CPC ......... *G03H 1/0005* (2013.01); *G03H 1/0443* (2013.01); *G01N 2015/016* (2024.01); *G01N 2015/1006* (2013.01); *G01N 2015/1454* (2013.01); *G01N 15/149* (2024.01); *G03H 2001/005* (2013.01); *G03H 2001/0447* (2013.01); *G03H 2001/045* (2013.01); *G03H 2001/0452* (2013.01)

(58) Field of Classification Search
CPC ......... G01N 2015/1454; G01N 15/147; G01N 2015/149; G01N 15/1433; G01N 2015/016; G01N 15/149; G03H 1/0005; G03H 1/0443; G03H 2001/005; G03H 2001/0447; G03H 2001/045; G03H 2001/0452; G03H 2001/0883; G03H 2210/62
See application file for complete search history.

(56) References Cited

U.S. PATENT DOCUMENTS

2012/0218379 A1* 8/2012 Ozcan ............... G03H 1/0443
348/40
2013/0242301 A1* 9/2013 Berg ............... G01N 15/1434
356/336
2015/0153558 A1* 6/2015 Ozcan ............... G01B 9/04
348/79
2017/0091528 A1* 3/2017 Savvides ............... G06T 7/90

FOREIGN PATENT DOCUMENTS

WO WO-2015175046 A2 * 11/2015 ......... G01N 15/1429
WO WO-2015195642 A1 * 12/2015 ......... G01N 15/1463

OTHER PUBLICATIONS

Xu, W., Jericho, M. H., Meinertzhagen, I. A., & Kreuzer, H. J. (2001). Digital In-Line Holography for Biological Applications. Proceedings of the National Academy of Sciences of the United States of America, 98(20), 11301-11305. http://www.jstor.org/stable/3056709 (Year: 2001).*

Fonseca, Elsa SR, Paulo T. Fiadeiro, Manuela Pereira, and António Pinheiro. "Comparative analysis of autofocus functions in digital in-line phase-shifting holography." Applied optics 55, No. 27 (2016): 7663-7674.

Ren, Zhenbo, Ni Chen, and Edmund Y. Lam. "Extended focused imaging and depth map reconstruction in optical scanning holography." Applied optics 55, No. 5 (2016): 1040-1047.

PCT International Search Report and Written Opinion, Application No. PCT/EP2018/086837, dated Apr. 10, 2019, 16 pages.

Asadi, Mohammad R., Amir Vahedi, and Hamidreza Amindavar. "Leukemia cell recognition with Zernike moments of holographic images." In Proceedings of the 7th Nordic Signal Processing Symposium—NORSIG 2006, pp. 214-217. IEEE, 2006.

Vercruysse, Dries, Alexandra Dusa, Richard Stahl, Geert Vanmeerbeeck, Koen de Wijs, Chengxun Liu, Dimiter Prodanov, Peter Peumans, and Liesbet Lagae. "Three-part differential of unlabeled leukocytes with a compact lens-free imaging flow cytometer." Lab on a Chip 15, No. 4 (2015): 1123-1132.

Gabor, Dennis. "Microscopy by reconstructed wave-fronts." Proceedings of the Royal Society of London. Series A. Mathematical and Physical Sciences 197, No. 1051 (1949): 454-487.

* cited by examiner

FAST AND ROBUST FOURIER DOMAIN-BASED CELL DIFFERENTIATION

CROSS-REFERENCE TO RELATED APPLICATIONS

This application claims the benefit under 35 U.S.C. § 371 of the filing date of International Patent Application No. PCT/EP2018/086837, having an international filing date of Dec. 24, 2018, which claims priority to European Application No. 17210427.5, filed Dec. 22, 2017, the contents of both of which are incorporated herein by reference in their entirety.

FIELD OF THE DISCLOSURE

This application relates to the field of automatic classification and devices for classifying microscopic particulates. In particular, this application relates to methods and devices for classification of microscopic particulates based on Fourier domain representations of holographic image recordings, as can, for example, be used in on-chip lens-free flow cytometry.

BACKGROUND

Leukocytes or white blood cells play an important role in the body's immune system as they are responsible for protecting from infections and invading organisms. Leukocyte counts are performed to detect abnormal balances of leukocytes, which are often caused by an underlying condition. Leukocyte differentials are performed to determine the concentration of each type of white blood cell present in a subject's blood. Both leukocyte counts and leukocyte differentials are essential measures to determine the subject's health as they can detect hidden infections and alert specialists of specific medical conditions, such as autoimmune diseases and blood disorders. Both tests are also used to monitor the effectiveness of chemotherapy during cancer treatment.

A fast, reliable, and accurate method for leukocyte characterization remains an ongoing research goal. Considerable efforts are made to develop portable hematology analyzers that can perform three-part leukocyte differentials at the point-of-care or in situations where a rapid analysis is crucial. Such smaller devices, e.g., benchtop or hand-held devices, play a crucial role in healthcare delivery in developing countries by bringing medical diagnosis closer to patients. They also have great utility in settings such as ambulances, pharmacies, doctor's practices, etc. In this context, lens-free in-line holographic microscopy, originally introduced by Gabor D. in Proceedings of the Royal Society of London A: Mathematical, Physical and Engineering Sciences, 1949, vol. 197, pages 454-487, is a promising technology that is capable of extracting enough morphological information from a cell in a label-free manner, i.e., without using fluorescent markers. Digital in-line microscopy utilizes relatively simple optics and hardware requirements that facilitate inexpensive and compact solutions for three-dimensional imaging. Furthermore, digital in-line microscopy facilitates capturing specimens at a high rate and providing a high-throughput microscopy platform.

A digital in-line holographic microscope (DIHM) conceptually works as follows: a coherent radiation source, e.g., a laser, is directed onto a narrow opening, e.g., a pinhole, with a diameter of the order of the wavelength of the laser. The pinhole acts as a point source from which a spherical wave emanates. The wave illuminates an object and forms a magnified diffraction pattern on a digital image sensor, which, in many cases, may be a CCD or a CMOS chip. If the scattered wave from the object is weaker in magnitude as compared to the unscattered reference wave, the interference pattern on the screen constitutes a hologram, which is then stored as a digital image. The spherical wave in front of the point source acts as an ideal flat lens transformation, magnifying the captured object and increasing the resolution of the entire acquisition setup. Lens-free microscopy was already used for imaging a wide variety of biological specimens, such as marine microorganisms, pollen spores, and various types of blood cells. The relative simplicity of the digital in-line holographic microscopy setup makes it a suitable candidate for integration with microfluidic devices, giving rise to new opportunities in the field of optofluidics. With these setups, spatial resolutions up to a few microns may be achieved, and temporal resolutions are only limited by the speed of the camera sensor (usually several hundreds of frames per second may be captured).

Vercruysse et al. Introduced in Lab on a Chip, 2015, vol. 15, pages 1123-1132 describes a compact lens-free imaging flow cytometer capable of capturing individual blood cells flowing through a microfluidic chip using a high-speed camera. FIG. 1 shows a schematic view of an acquisition setup. Therein, different types of cells 106 flow 105 over the imaging area of the microfluidic channel 104. A waveguide 101, acting as a point source 102, and a CMOS-imaging sensor 109 are placed on each side of the microfluidic chip 103. A laser 100 illuminates the passing cells 106. The scattered 107 and unscattered 108 light, forming an interference pattern (hologram), is then captured by the imaging sensor 109. A schematic view of a flow cytometry chip 20, with as primary function the fast sorting of cells 206, is depicted in FIG. 2. Related thereto is the idea to determine the type of the cell 206 captured by an integrated DIHM framework 216, flowing 205 through the microfluidic channel 204 from an inlet 210 towards an outlet 215, by the time the cell 206 arrives at the microfluidic switch 217. The cell 206 is then directed to a specific outlet 215 according to its type. Microheaters 212 located in this area produce microscopic steam bubbles 213, pushing 214 each cell 206 to the desirable outlet 215. A buffer solution is injected into two inlets 211 adjacent to the cell inlet 210 to establish a stable microfluidic flow 205 inside the microfluidic channel 204, which also aligns the individual cells 206. This solution aims to replace the traditional microscope. Furthermore, the solutions compact form allows for a parallelized setup, drastically increasing the throughput of cells 206 to be analyzed. To identify an individual cell 206 and direct the cell 206 to a specific microfluidic outlet 215, as depicted in FIG. 2, aspects of the cell 206 need to be digitally acquired and processed to extract features associated with the cell 206. A three-part white blood cell differential was illustrated, capable of distinguishing granulocytes, monocytes, and T-lymphocytes from each other. Features that characterize internal complexity and cell size are extracted from reconstructions of the holographic data. The method was validated by performing a three-part classification from a minimally processed whole blood sample and compared to a conventional hematology analyzer. The same authors later extended their setup by fitting it with a triggering mechanism for fluorescence-labeled single cells, ensuring a more reliable "ground-truth" labeling.

In the same work, an extended range of image features was investigated to achieve a robust three-class leukocyte classification. While the leukocyte classification pipelines proposed above show good classification performance, one of their main issues resides in the computation time: the cell detection, the multiple propagations for automated refocusing do not scale well for the classification of a large number of cells (even after GPU acceleration) in real-time.

SUMMARY

It is an object of the application to provide methods and systems for automatic classification of microscopic particulates.

The above objective is accomplished by a method and device according to various example embodiments.

An example of a differentiation system for differentiating microscopic particles comprises:
- an input device configured to receive holographic image data of a microscopic particle in suspension, the holographic image data being holographic images acquired from the microscopic particle in suspension,
- holographic image data processing logic configured to convert the holographic image data to the frequency domain by performing a Fourier transform of the holographic image data, and
- a microscopic particle recognizer configured to determine characterization features of the holographic image data of the microscopic particle in the frequency domain for characterization of the microscopic particle, the characterization features comprising rotational invariant features. The rotational invariant features may be rotational invariant moments.

The holographic images may be holographic images captured with a holographic microscope. The holographic data may comprise depth information. The Fourier transform may be a discrete Fourier transform. The Fourier transform may be a fast and discrete Fourier transform (FFT), e.g., implementable on a GPU.

In some examples, the characterization features can be determined based on the Fourier transformed data, without performing additional processing steps such as, for example, focusing by adapting a propagation operator.

An example allows miniaturization of the system since the amount of processing and therefore, the required processing power can be limited. In an example, a system consuming less energy than conventional classification systems can be obtained. In an example, an imaging sensor can be used with low resolution, depending on the particles to be differentiated.

Example systems and methods are provided, allowing high-throughput cell counting and classification.

Examples of systems and methods are provided that facilitate real-time analysis. In some examples, classification of cells, e.g., leukocytes, can be performed in real-time.

An example corresponds to a differentiation system that can include and/or implement the aspects described above. In this example, the input device is a holographic microscope adapted for capturing depth information during imaging.

The microscopic particle recognizer is configured to determine characterization features of the holographic image data of the microscopic particle whereby only a single Fourier transform is applied to the received holographic image data.

The holographic image data processing logic may be configured to pre-process the holographic image data for data reduction in both spatial and frequency domains.

The holographic image data processing logic may be configured to resize and/or crop the holographic image data around the center of the illumination.

The differentiation may be performed on individual cells. The image data thus may be image data of individual cells or be resized or cropped to image data of individual cells.

The holographic image data processing logic may be configured to take an absolute value of the Fourier transform of the holographic image data.

The rotationally invariant features may comprise Zernike moments up to order 6. The rotationally invariant features may comprise Zernike moments up to order 22.

The rotationally invariant features may comprise magnitudes of Zernike moments or may comprise particular combinations of Zernike moments that are invariant.

In some examples, the reconstruction of the holographic data can be bypassed. The latter is obtained by using extraction of rotationally invariant features based on the data captured in the frequency domain.

Example methods and systems provide robustness to translations and rotations of cells, as well as to changes in the distance of a cell with respect to the image sensor.

Example systems and methods are provided that facilitate achieving a high degree of accuracy. In some examples, the accuracies may be up to at least 90%, e.g., up to at least 93%, e.g., up to at least 95%, such as for example 96.8%.

Example systems and methods are provided that make use of rotationally invariant features, such as, for example—but not limited to—Zernike moment. Some other examples are Hu moments, any other orthogonal rotational invariant moments, or in general, any rotationally invariant feature.

The microscopic particles recognizer may be configured to determine rotationally invariant features, $F_n$, as:

$$F_n = \left| \sum_{x,y} M_n(x, y) f(x, y) \right|$$

wherein f(x, y) represents the (rescaled) absolute value of the Fourier transform of the holographic image data, for $x^2+y^2 \leq 1$ and $M_n(x, y)$ for arbitrary $n \in \mathbb{N}$ are moments with rotational symmetry, expressed in cartesian coordinates.

The moments may, in some examples, be Zernike moments given by $V_{n,m}(\rho, \theta) = R_{n,m} \exp(jm\theta)$, expressed in polar coordinates so that $\theta$ is the azimuthal angle, $\rho$ is the radial distance $0 \leq \rho \leq 1$, and j is the imaginary unit, n are non-negative integers representing the order of the Zernike polynomials and m represents repetitions of Zernike polynomials which satisfy the constrain of $$\frac{(n-|m|)}{2}$$

$\in \mathbb{N}$, $|m| \leq n$, and $R_{n,m}$ are the radial polynomials $$R_{n,m} = \Sigma_{s=0}^{(n-|m|)/2} (-1)^s \frac{(n-s)!}{s! \left( \frac{n+|m|}{e} s \right)! * \left( \frac{n-|m|}{2} s \right)!} \rho^{(n-2s)}.$$

The system furthermore may comprise a microscopic particle classifier configured to classify the microscopic particles based on the determined features of the microscopic particles using the microscopic particle recognizer.

The microscopic particle recognizer may correspond to a cell recognizer, and the microscopic particle classifier may correspond to a cell classifier configured to classify white blood cells as a T-lymphocyte, a granulocyte or a monocyte based on the determined features of the white blood cell determined using the cell recognizer.

In some examples, accurate identification of different types of leukocytes can be performed, e.g., that granulocytes, monocytes, and T-lymphocytes can be differentiated.

Example systems and methods are provided that result in a reduced computational complexity, thus allowing very fast processing and classification, making the systems and methods, for example, applicable in high-throughput flow cytometry setups.

The input device may comprise a holographic image data acquisition system for acquiring holographic image data of a microscopic particle in suspension.

The holographic image data processing logic may be configured to remove a background from the holographic image data.

An example of a diagnostic device comprising a differentiation system can include and/or implement the features described above. The diagnostic device is configured to analyze microscopic particles, such as for example, white blood cells.

Example systems and methods can be implemented as or in a portable hematology analyzer, which is, for example, suitable in a resource-limited setting or an emergency setting.

Some examples facilitate implementation of an in-line holographic imaging system the obviates the requirement for complex and expensive optics.

An example relates to a method comprising:
receiving holographic image data of a microscopic particle in suspension,
converting the holographic image data to the frequency domain by performing a Fourier transform of the holographic image data, and
determining characterization features of the holographic image data of the microscopic particles in the frequency domain for characterization of the microscopic particles, the characterization features comprising rotationally invariant features.

The holographic images may be holographic images captured with a holographic microscope. The holographic data may comprise depth information. The rotationally invariant feature may be rotationally invariant moments. The method may further comprise, based on the determined cell recognition features, identifying whether a cell is a white blood cell or another cell type, for example, a malignant/cancerous cell.

The method further may comprise, based on the determined cell recognition features, identifying whether a microscopic particle is a T-lymphocyte, a granulocyte, or a monocyte.

Particular aspects are set out in the accompanying independent and dependent claims. Features from the dependent claims may be combined with features of the independent claims and with features of other dependent claims as appropriate and not merely as explicitly set out in the claims.

For purposes of summarizing the invention and the aspects achieved over the prior art, certain objects and aspects have been described hereinabove. It is to be understood that not necessarily all such objects or aspects may be achieved in accordance with any particular example. Thus, for example, those skilled in the art will recognize that aspects disclosed herein may be embodied or carried out in a manner that achieves or optimizes one aspect or group of aspects as taught herein without necessarily achieving other objects or aspects as may be taught or suggested herein.

The above and other aspects will be apparent from and elucidated with reference to the examples described hereinafter.

BRIEF DESCRIPTION OF THE FIGURES

The above, as well as additional features, will be better understood through the following illustrative and non-limiting detailed description of example embodiments, with reference to the appended drawings.

Figure 1:
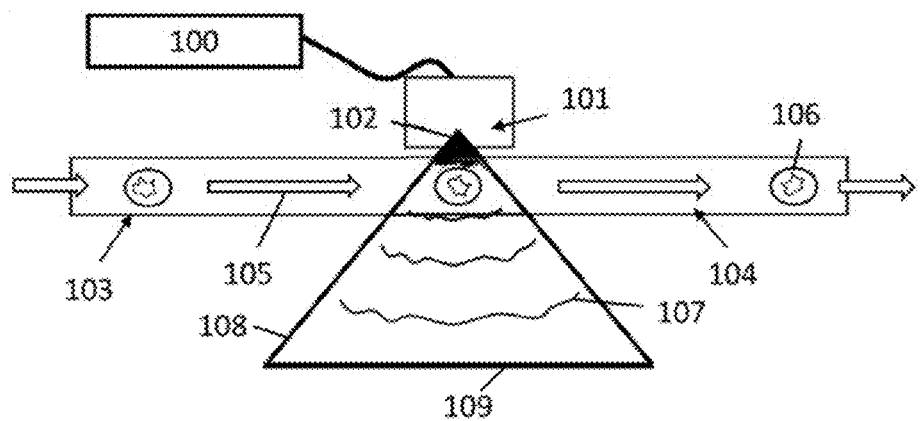
FIG. 1 shows a schematic view of a digital in-line holographic microscope setup.
Figure 2:
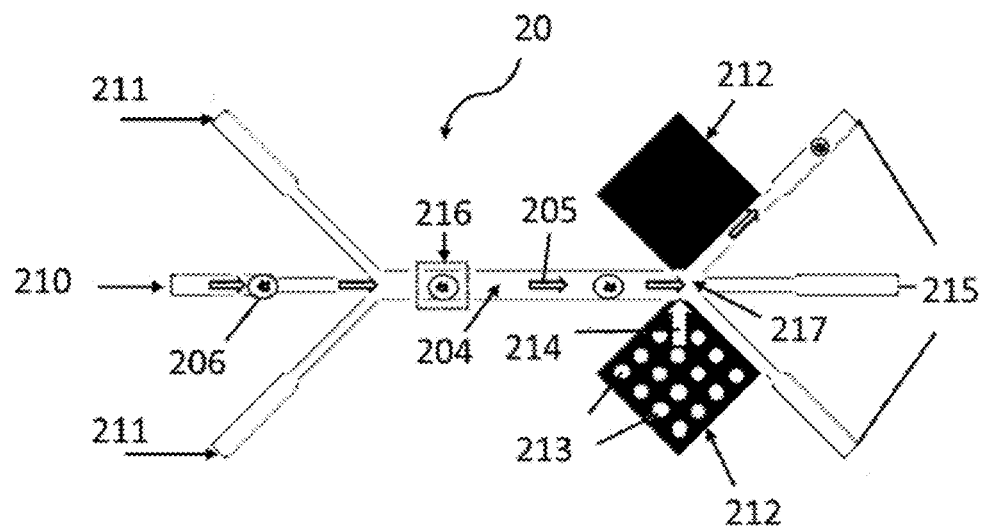
FIG. 2 shows a schematic representation of an integrated cell sorter platform.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION

Various examples are described with respect to certain drawings. The claims are not understood to be limited to these examples.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the examples described herein are capable of operation in other sequences than described or illustrated herein.

Moreover, directional terminology such as top, bottom, front, back, leading, trailing, under, over and the like in the description and the claims is used for descriptive purposes with reference to the orientation of the drawings being described and not necessarily for describing relative positions. Because components of examples can be positioned in a number of different orientations, the directional terminology is used for purposes of illustration only and is in no way intended to be limiting, unless otherwise indicated. It is, hence, to be understood that the terms so used are interchangeable under appropriate circumstances and that the examples described herein are capable of operation in other orientations than described or illustrated herein.

It is to be noticed that the term "comprising," used in the claims, should not be interpreted as being restricted to any means listed thereafter, and that the term does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to certain examples, the only relevant components of the device are A and B.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment, but may. Furthermore, the particular features, structures, or characteristics may be combined in any suitable manner, as would be apparent to one of ordinary skill in the art from this disclosure, in one or more embodiments.

Similarly, it should be appreciated that in the description of certain examples, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the examples require more features than are expressly recited in each claim. Rather, as the following claims reflect, example aspects lie in less than all features of a single foregoing disclosed example. Thus, the claims following the detailed description are hereby expressly incorporated into this detailed description, with each claim standing on its own as a separate example.

Furthermore, while some examples described herein include some but not other features included in other examples, combinations of features of different examples are meant to be within the scope of the claims, and form different examples, as would be understood by those in the art. For example, in the following claims, any of the claimed examples can be used in any combination.

It should be noted that the use of particular terminology when describing certain features or aspects should not be taken to imply that the terminology is being re-defined herein to be restricted to include any specific characteristics of the features or aspects with which that terminology is associated.

In the description provided herein, numerous specific details are set forth. However, it is understood that embodiments may be practiced without these specific details. In other instances, well-known methods, structures, and techniques have not been shown in detail in order not to obscure an understanding of this description.

Where reference is made to microscopic particles, reference is made to a group of particles, including microstructures, cells such as, for example—but not limited to—white blood cells or spores.

Since attempts to rapid, large-scale automation of microscopic particle classification in general, and white blood cell classification in particular as described in the prior art, suffer from time-consuming computation time, it is an object of examples to speed up computation time by operating feature extraction for characterization in the Fourier domain of the microscopic particles, i.e., without performing image reconstruction. This is realized in an intelligent manner, allowing for cell classifications typically within less than 1 ms.

A first aspect relates to a differentiation system for differentiating microscopic particles. The system may be especially suitable for differentiating white blood cells, although the examples disclosed herein are not limited thereto. According to examples, the system comprises an input device configured to receive holographic image data of a microscopic particle in suspension, and holographic image data processing logic configured to convert the holographic image data to the frequency domain by performing a Fourier transform of the holographic image data. The system also comprises a microscopic particle recognizer configured to determine characterization features of the holographic image data of the microscopic particle in the frequency domain for characterization of the microscopic particle, the characterization features comprising rotational invariant features. The rotational invariant features may be rotational invariant moments. The feature extraction may be performed in the Fourier space without any propagation, shape detection, or other classical object detection method.

In some examples, the holographic image data are holographic images acquired from the microscopic particle in suspension. The holographic image data may correspond to holographic images captured using a holographic microscope. The image data may thus contain depth information.

Further features and aspects will be described with reference to particular examples.

Figure 3A:
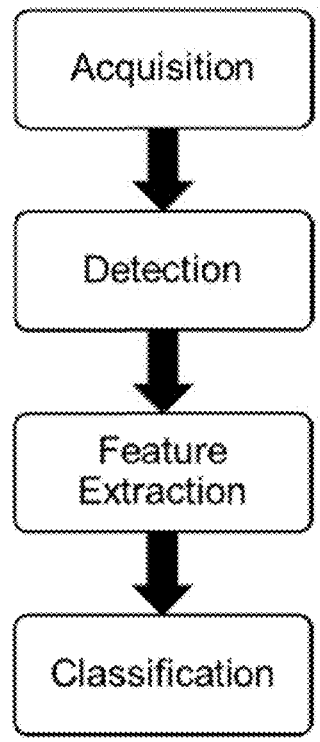
FIG. 3A and FIG. 3B illustrates a flowchart (FIG. 3A) showing the sequence of processing steps that lead from the raw image acquisition to the cell classification, as well as a schematic representation (FIG. 3B) of object classification, in accordance with an example.

The differentiation system, in an example, may be a differentiation system that is configured to perform the different aspects, as shown in FIG. 3A.

Figure 3B:
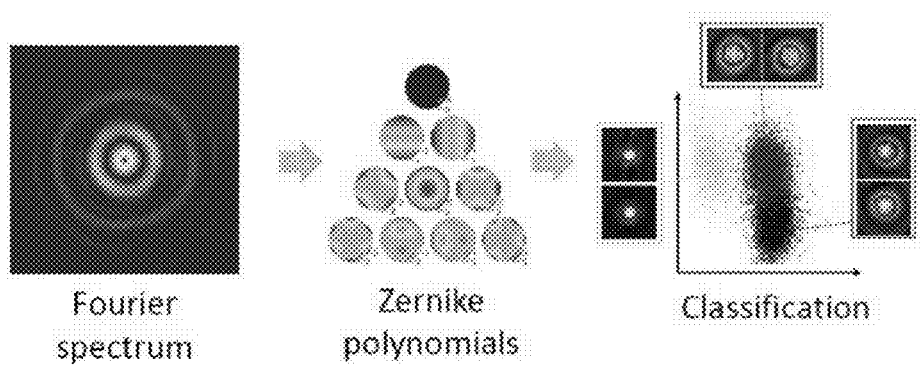

FIG. 3A illustrates different processing steps that may be performed for differentiating microscopic particles, such as cells. The system may be configured to acquire images and detecting a microscopic particle. The system also is configured to perform feature characterization on the holographic data and to differentiate the microscopic particle to determine a type of the microscopic particle. A schematic representation of the steps is also shown in FIG. 3B.

In some examples, the differentiation system may be configured to perform the following aspects:

First, the obtained images are downsampled to a predetermined chosen size (in one example shown below this is to a 32×32 pixel image, although the examples are not limited thereto. The downsampling may be bilinear downsampling. The downsampling is mathematically equivalent to cropping the obtained images in the Fourier space, but with an O(n) complexity.

Then, a Fourier transformation is performed on the downscaled version of the original images. Such a Fourier transformation may be a Fast Fourier Transform in some examples.

The rotational invariant features, e.g., Zernike moments, are then pre-computed.

The feature extraction is then performed, comprising a pointwise multiplication of the pre-computed rotational invariant features with the Fourier spectrum of the object.

A differentiation system according to an example may be a cell differentiation system that may comprise the following properties and requirements which may be used for the design of a robust cell classification framework:

Almost all of the relevant information for determining cell characterization features is concentrated in a lower frequency range due to the geometry of the DIHM setup.

Translations parallel to the holographic image data acquisition plane, e.g., a sensor plane, e.g., a CMOS sensor plane, typically do not affect classification performance.

The distance of the suspended cell to the holographic image data acquisition plane, e.g., a sensor plane, e.g., a CMOS sensor plane, typically does not affect classification performance.

According to some examples, the features used are rotationally invariant, and by extension, the proposed differentiation and related classification methods are rotationally invariant.

In accordance to the above observations, a feature extracting scheme is proposed, which operates in the frequency domain (Fourier domain). The scheme facilitates taking, for example, the discrete fast 2D Fourier transform of an image by a computing device, which is a relatively straightforward operation in terms of required time and computational resources. The reconstruction of the hologram being avoided altogether, the 2D fast Fourier transform may easily be implemented on a dedicated computing device, e.g., a GPU. Furthermore, the discrete fast Fourier transform (DFT) is inherently invariant to cyclic fixed-size translations, and the DFT concentrates the most relevant information for determining cell characterization features of the cells in close proximity to the signal's (2D holographic image data) DC-component. It is a goal of some examples to build an efficient classification pipeline with robust features selected from the Fourier domain that are essentially invariant under lateral and axial translations as well as rotations as described hereinafter.

The propagation of light under scalar diffraction theory is modeled by the Huygens-Fresnel principle, which is generally not efficiently computable for arbitrary surfaces. However, in the case of a planar surface, diffraction reduces to a convolution and is more easily described in terms of the angular spectrum of plane waves. The Angular Spectrum Method (ASM) is based on the notion that wave propagation can be described by the propagation of its decomposed spectrum. The spectral Fourier coefficients of the transformed wave signal correspond to plane waves, each undergoing a different phase delay depending on the propagation distance. The Angular Spectrum Method (ASM) may be implemented according to Eq. 1.

$$U(x, y, z) = U(x, y, 0) * H_z(x, y) = \mathcal{F}^{-1}\{\mathcal{F}\{U(x, y, 0)\}e^{i\pi z\sqrt{\lambda^{-2}-k_x^2-k_y^2}}\} \quad (1)$$

In Eq. 1, U represents the wavefield, Hz is the ASM kernel for propagating along a distance z. The ASM kernel is more conveniently expressed in the Fourier domain by introducing the Fourier operator F and its inverse $F^{-1}$ as well as the angular (spatial) frequencies $k_x$ and $k_y$. The wavelength of the illumination laser is denoted by λ. The ASM is a reconstruction method for recovering the amplitude and phase images from a captured hologram microscopy image. Hereunder, a classification method according to examples of one aspect may be compared in terms of performance to conventional classification methods that first reconstruct the original microscope image of the cell from the recorded holographic image data by using a suitable reconstruction method, e.g., the angular spectrum method. For the sake of completeness, the reconstruction method based on the angular spectrum method was discussed above in somewhat more detail to explain that the Angular Spectrum Method does not affect the absolute value of the Fourier Transform. The invariance to the z-translation is shown.

In an example, a holographic image of the suspended cell, captured by a suitable acquisition device, e.g., a CMOS sensor camera, is first transformed under a discrete, two-dimensional fast Fourier transformation by a data processing device, e.g., a computer or a GPU. This transformation may, in some cases, be preceded by an image resizing step and/or the cropping of a central portion of the holographic image data, which is also carried out by the data processing device. The absolute value of the Fourier transform may then be taken. This results in invariance for both lateral as well as axial, i.e., depth, translations. Lateral translations of the suspended cell with respect to the plane on which the holographic image data is recorded is equivalent to a point-wise multiplication of the Fourier transform of the holographic image with a constant phasor. Depth translations are equivalent to propagations using the ASM kernel, which only modify the phase of the Fourier domain.

With regard to rotationally invariant features obtained from the Fourier transformed holographic image data according to some examples, invariants constructed from Zernike moments are one staring point. Rotation invariant Hu moments may be an alternative choice in alternative examples.

Zernike moments are a sequence of functions that are orthogonal on the unit disk. Due to their orthogonality, properties of a decomposed image (decomposed onto the Zernike moment basis functions) are represented without redundancy or overlap of information between the decomposition coefficients. The magnitudes of Zernike decomposition coefficients, also designated as Zernike image moments, are independent of the rotation angle of the object in a region of interest. The (real-valued) Zernike moments are defined on the unit disk in polar coordinates (ρ, φ) where 0≤ρ≤1. They are defined for all non-negative integers n, m with n≥m, and (n−m) even:

$$Z_n^m(\rho, \varphi) = R_n^m(\rho)\cos(m\varphi) \text{ and } Z_n^{-m}(\rho, \varphi) = R_n^m(\rho)\sin(m\varphi) \quad (2)$$

where $$R_n^m(\rho) = \sum_{k=0}^{\frac{n-m}{2}} \frac{(-1)^k(n-k)!}{k!\left(\frac{n-m}{2}-k\right)!\left(\frac{n+m}{2}-k\right)!}\rho^{n-2k} \quad (3)$$

The features $$\sqrt{(Z_n^m)^2 + (Z_n^{-m})^2}$$

are rotationally invariant for all valid m and n.

In an example manner, the cell differentiation system and method, and related classification method, according to some examples, are now described.

Figure 4:
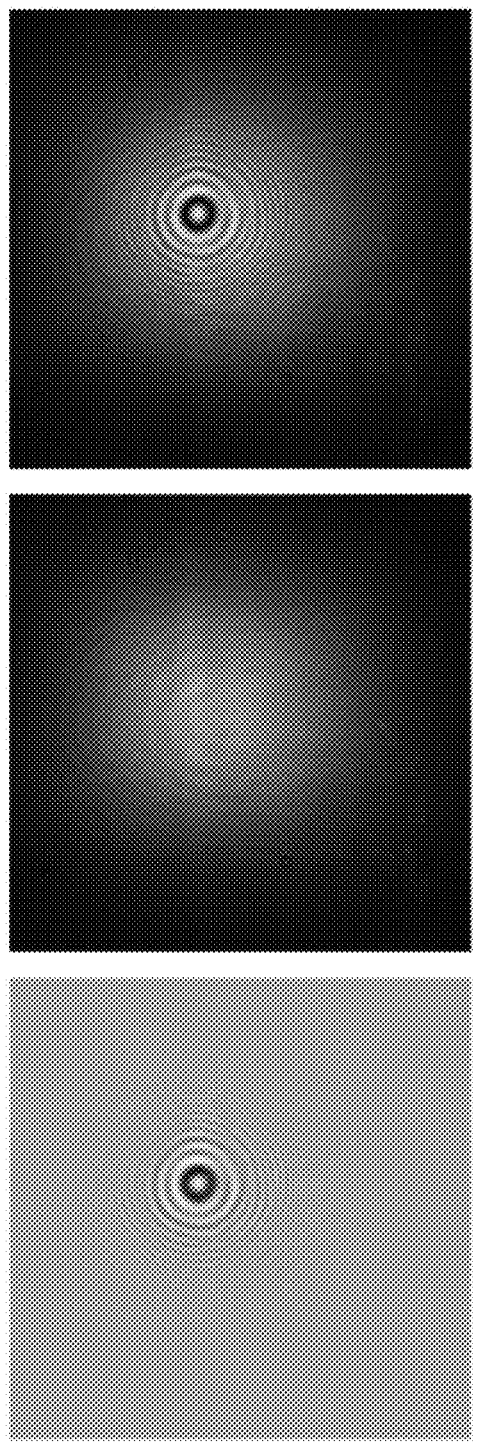
FIG. 4 displays an example of a holographic microscope image of a cell at the top, its isolated background in the center, and the background-corrected microscope image at the bottom, in accordance with an example.

In the beginning, holographic image data of suspended cells is recorded using a suitable setup. An acquisition device, e.g., a CMOS camera, e.g., a CMV2000 CMOS image sensor having a 5.5 μm pixel size, produces holographic image data, which may be a grayscale image, e.g., an 8-bit grayscale images with a size of 2048×1088 pixels. It may be convenient to record two types of holographic images, one type being content images that contain the holographic fingerprint of a suspended cell, and the other type being background images acquired at moments during which no suspended cell is present in the detection volume sensed by the image sensor (see FIG. 4 for an example of both types). In some examples, context-free background images may be subtracted from the content images as a pre-processing step so as to enhance the signal-to-noise ratio of the holographic image. Both types of images are used as the two classification pipelines considered may use subtracting an empty background from each content image as a pre-processing step to enhance the signal-to-noise ratio of the holographic image.

An acquisition device may be provided with a fluorescence trigger mechanism to facilitate the exact timing of both content frames containing a holographic fingerprint of the suspended cell and corresponding background images. Furthermore, the fluorescent labeling of suspended cells may be an interesting optional feature that establishes a 'ground-truth' for a cell differentiation method, e.g., for assessing a three-part leukocyte differential obtained from the holographic image data alone, although it might not always be entirely reliable, e.g., cross-contamination effects across different cell subtypes, which may a measurable impact on an obtained classification performance. Another pre-processing step carried out by a suitable data processing device, e.g., a computer, an FPGA, a GPU, or an ASIC, may comprise the removal of empty images, e.g., background images, that have been erroneously labeled as content images. This may be achieved by detecting the mean energy of holographic image data in the frequency domain. Images not containing any cell information typically have a lower energy signature than content images. In a particular example of carrying out the method according to one aspect, a total of approximately 18,400 pre-processed raw holographic image data acquisitions comprising cell information were obtained and matched to their background images. The population of white blood cell subtypes was evaluated as follows: monocytes and granulocytes consisted each of about 8,800 and 8,000 instances, respectively, whereas the T-lymphocytes with a total of 1,600 instances were less numerous.

Figure 5:
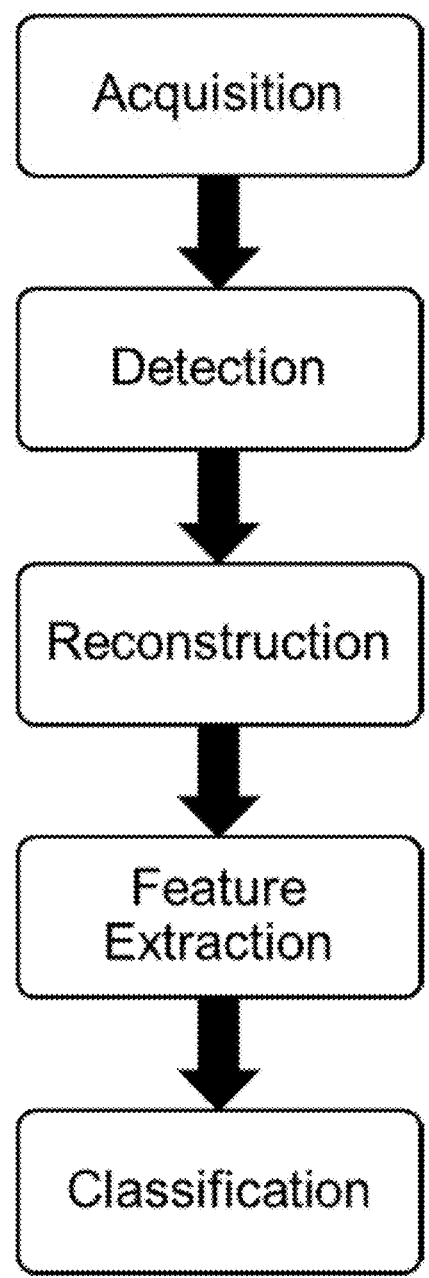
FIG. 5 is a flowchart showing the sequence of processing steps that lead from the raw image acquisition to the cell classification, in accordance with an example.

For the purpose of comparison, the steps of a differentiation and classification method are carried out at this point. The most prominent processing steps are depicted in the flowchart of FIG. 5. In particular, prior to reconstruction of the cell images based on the holographic image data recorded, the background is subtracted from each content image, as shown for instance in the bottom picture of FIG. 4. To obtain the reconstructed amplitude and phase images of a single white blood cell, a cropped image of 600×600 pixels size and centered around the cell is reconstructed numerically using the angular spectrum method, as expressed in Eq. 1. The reconstruction depth, which influenced the magnification factor, is selected by a best focus criteria applied to the reconstructed image of the original, suspended cell. A wide range of measures and methods to estimate such a best focus are known in literature, including spatial-, spectral-, and sparsity-based methods, e.g., in FONSECA, E. S. R. et al. Comparative analysis of autofocus functions in digital in-line phase-shifting holography. Applied Optics, 2016, vol. 55, pages 7663-7674 and in REN, Z. et al. Extended focused imaging and depth map reconstruction in optical scanning holography. Applied Optics, 2016, vol. 55, pages 1040-1047. For this example data set, good and robust results were obtained from a combination of three methods. Two of the results are based on the gradient mean and the standard deviation metric, because the sharpest reconstructions tend to have the highest gradient energy. The third method uses an entropy metric to measure the sharpness of the reconstruction. It worth noting that estimating the reconstruction depth for each cell, or for consecutive cells instead, is a computationally expensive task and constitutes a bottleneck for the fast processing of high-throughput holographic data.

The sharply focused cell image being reconstructed on the basis of its holographic image data, a number of representative features are extracted therefrom. There may be a set of eight selected and extracted features for each cell considered describing in essence its overall shape characteristics as well as the textural characteristics of its nucleus. Four shape features are derivable from the reconstructed phase image of the suspended cell, whereby reconstructed phase images typically implement well-known phase unwrapping methods and thresholding methods, e.g., Otsu's method. The four shape features may be selected, such as area, eccentricity, radius mean, and standard deviation. The textural features may comprise grayscale co-occurrence features. Those textural features are obtained from the reconstructed amplitude image of the suspended cell and are averaged over angles of 0, 45, 90, and 135 degrees. The latter operation is generally performed to induce rotation invariance in the extracted features.

Figure 6:
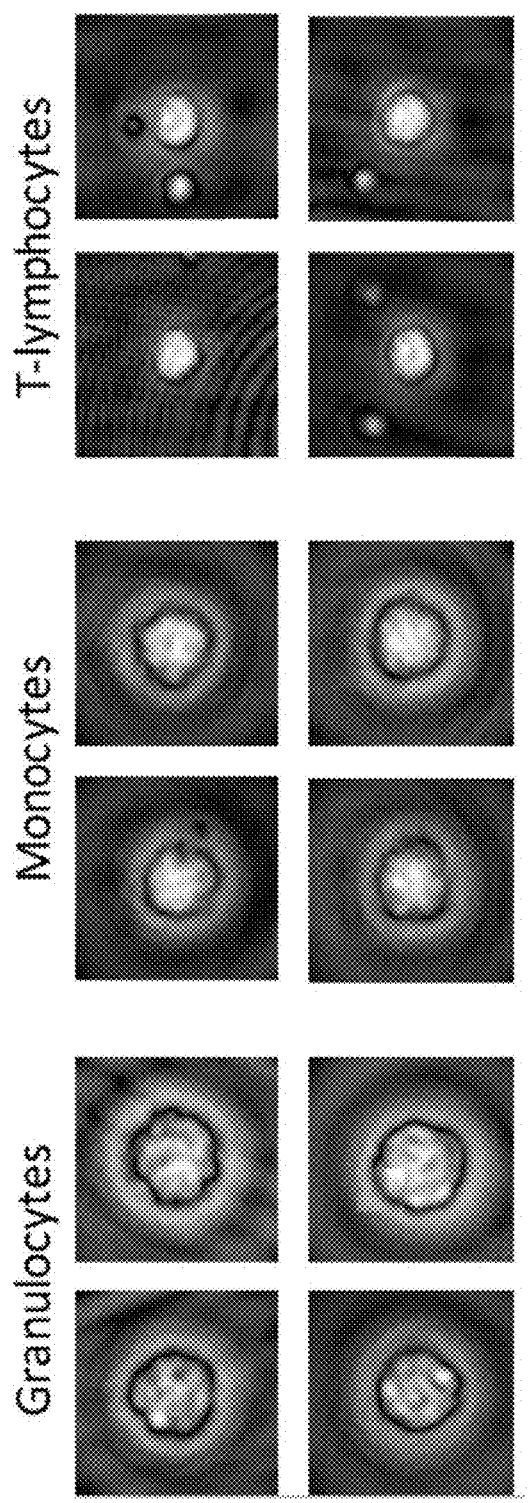
FIG. 6 illustrates reconstructions of microscopic cell images for three different white blood cells using an angular spectrum method, in accordance with an example.
Figure 7:
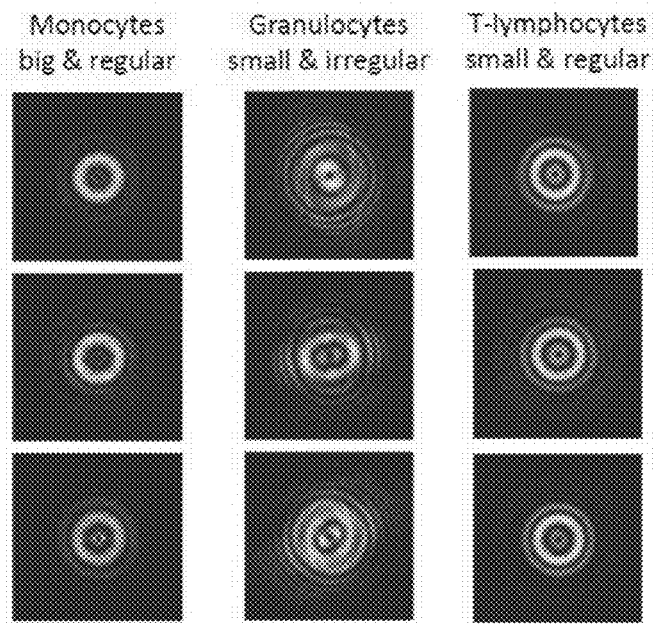
FIG. 7 illustrates characteristic features for three different white blood cells, in accordance with an example.
Figure 8:
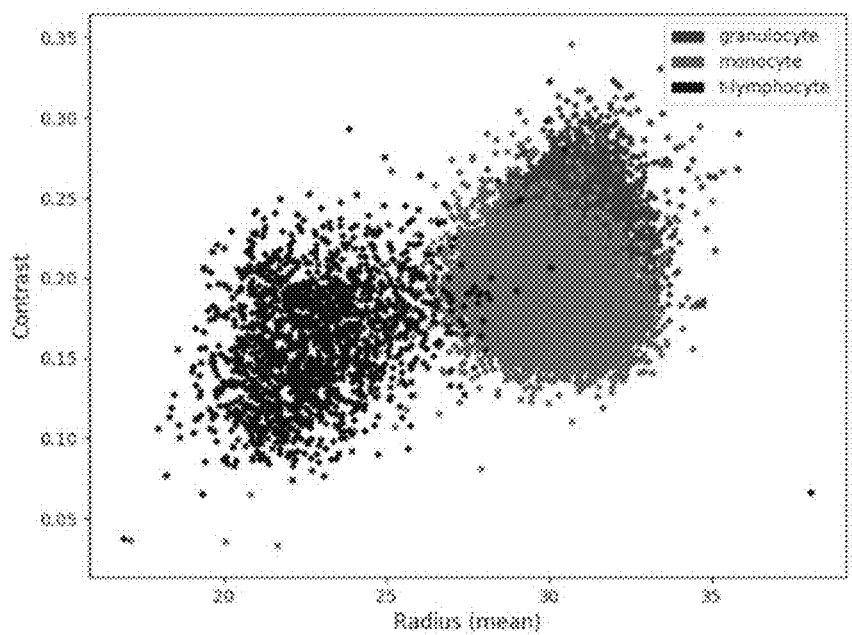
FIG. 8 represents a two-dimensional scatter plot of samples drawn from a population of three different leukocyte types, on which the mean radius is plotted against the homogeneity contrast, in accordance with an example.

As is observed from the cell image reconstructions in FIG. 6, and as is confirmed in specialized literature, T-lymphocytes typically appear smaller than the two other types of white blood cells. Granulocytes may be distinguished from monocytes as their inner cell portion is typically roughened, e.g., more granular, due to the presence of granules in their cytoplasm. The characteristics of the typical cells also are illustrated in FIG. 7. Both these observations are confirmed by the extracted features. A scatter plot depicted in FIG. 8 indicates instances of three distinct white blood cell subtypes in a two-dimensional space spanned by the radius mean feature variable and the granularity contrast feature variable. In this space T-lymphocytes are clearly differentiated by a smaller radius and granulocytes are differentiated by a slightly larger granularity contrast value.

An example of a classifier that can be used in connection with the examples described above corresponds to a Random Forest classifier in combination with a 10-fold cross validation scheme. It should be noted that all the processing steps involved prior to the feature extraction step not only increase the computational cost per imaged cell, but also increase the risk of introducing additional errors to an already imperfect data set, e.g., via imperfect centering, phase unwrapping, or subsequent thresholding. This may have a direct impact on the extracted features directed to the shape characteristics of the white blood cells.

The classification accuracy obtained with the example cell classification method similar to what is known in the field amounts to 92% for a population of about 8000 granulocytes, about 8800 monocytes, and circa 1600 T-lymphocytes. The confusion matrix in Table A shows that the T-lymphocytes are well separated, while most classification errors occur amongst granulocytes and monocytes.

In an example, a cell differentiation method and system, and related cell classification method start with the holographic images which are content images and which are all corrected for their respective backgrounds before being cropped around their centers, whereby the center is selected as the illuminating laser beam center as it is projected onto the imaging sensor placed at the hologram plane. As most information on the cell is concentrated in the lower frequencies of the holographic image, it is possible to further resize a cropped image of a suspended white blood cell of size 600×600 to an image of size 32×32 pixels, the size of 32×32 pixels being determined experimentally. This is functionally (almost) equivalent to cropping the Fourier transform of the image around the DC coefficient, but this operation is computationally more efficient: it has a time complexity of $O(n)$ instead of $O(n \log n)$ for a pixel count of n. Further cropping may be beneficial to further reduce the computational load and increase the computation speed related to performing the Fourier transformation. The absolute value of the Fourier transformed 32×32 image is then multiplied with each pre-computed Zernike moment basis function. A first set of 28 real Zernike moments (up to order 6) may subsequently be reduced to 16 moments. The resulting set of image moments constitute rotationally invariant features. From those 16 selected and extracted Zernike features, a cell classification accuracy of 94.8% may be obtained for the cell data set. As is reported in the confusion matrix of Table B, the T-lymphocytes are again well separated from the two other white blood cell subtypes. However, some misclassification between granulocytes and monocytes persists. According to an alternative example, the differentiation and classification method are performed with an increased amount of Zernike moments, up to order 22, resulting in a total of 144 rotational invariant features per white blood cell. It is to be noticed that by identification of the 10 most relevant features for this application, classification accuracies up to 96.8% could be reached. The obtained cell classification accuracy is now as high as 96.8%. The corresponding confusion matrix is reproduced in Table C, reporting the results with 144 features, whereas table D reports the results after feature reduction. When compared to the previous experiment, it was observed that there is an improvement in the classification of granulocytes and monocytes, indicating that there is discriminative information contained in the higher order Zernike moments.

Benefits of the differentiation system and method according to some examples are the increased robustness, which is obtained as a result of introducing invariant features with regard to translations, rotations, and axial shifts. Moreover, the differentiation system may be deployed on an optofluidic platform, in which case the processing steps carried out by performing the method need to be computationally efficient. A method and related system similar to what is known in the technical field, however, involve the reconstruction of the original cell images prior to feature extraction and comprises numerous processing steps that slow down the entire differentiation process and system. In particular, at least two Fourier transformations have to be performed for reconstruction. In contrast, some examples disclosed herein can perform feature extraction if only a single Fourier transformation is performed. Other computationally expensive steps are related to the extraction method of features, which involves processing the reconstructed phase and amplitude images of the suspended cells. Many matrix operations have to be performed on the reconstructed cell images for this purpose alone. The processing of a single cell in an unoptimized Matlab™ implementation on a 2.6 GHz Intel Core i7 architecture machine may take up to 500 ms, including the time for holographic raw image pre-processing, for a single reconstruction with the angular spectrum method at a preset, optimal reconstruction depth, and for the feature extraction. In contrast thereto, some examples comprise a downscaling operation, followed by a single Fourier transform, and the feature extraction. Based on the results portrayed in Tables B and C, one concludes that higher order Zernike moments may be better suited for differentiating the granulocytes from the monocytes. To further improve the performance of the proposed system, it is possible to identify the features that contribute most to the cell classification accuracy. A popular feature selection approach may be wrapper based, i.e., using a generic learning algorithm such as for example decision trees, neural networks, SVM, PCA, LDA, etc. and evaluate the performance of that learning algorithm on the data set with different subsets of features selected. Accordingly, the total number of features may further be reduced from 144 to 10, which significantly reduced the feature space too. The corresponding confusion matrix is shown in Table D, and the obtained cell classification accuracy amounts to 96.8%. Retained features with this refined method correspond to both the lower and higher order moments.

In an example, when implemented on a GPU, the processing time for cell differentiation and cell classification is reduced to 0.2 ms per cell, which makes the example method and system well suited for practical setup with thousands of cells per second to be processed. An example system and method may be configured for implementation in an integrated processing device, e.g., an ASIC customized for this particular application such that massively parallel architectures become possible, e.g., multiple cell sorter chips working in parallel.

Some examples may be adapted to a variety of hematology tests and testing devices, such as leukocyte counts and three-part, five-part, and 7-part differentials, and yield high cell classification accuracies.

Furthermore, some examples may only determine cell characterization features that are related to relatively low frequencies such that low-resolution cameras may be sufficient to distinguish different cell types.

A second aspect relates to a method for differentiating microscopic particles, such as for example, cells like white blood cells. The method may be applicable for differentiating white blood cells in a T-lymphocyte, a granulocyte, or a monocyte, although embodiments are not limited thereto. The method comprises receiving holographic image data of a microscopic particle in suspension, converting the holographic image data to the frequency domain by performing a Fourier transform of the holographic image data, and determining characterization features of the holographic image data of the microscopic particles in the frequency domain for characterization of the microscopic particles, the characterization features comprising rotationally invariant moments. The method may be performed using a system as described in the first aspect, although the examples described here are not limited thereto. The method may allow identification of whether a microscopic particle is a healthy cell or a malignant/cancerous cell. Further steps of the method may correspond with the functionality of features of examples of the system according to the first aspect.

A further aspect relates to a processor for performing a method as described in the second aspect. The above described method examples may be implemented as software in a processor. One configuration of such a processor may, for example, include at least one programmable computing component coupled to a memory subsystem that includes at least one form of memory, e.g., RAM, ROM, and so forth. It is to be noted that the computing component or computing components may be a general-purpose, or a special purpose computing component, and may be for inclusion in a device, e.g., a chip that has other components that perform other functions. Thus, one or more aspects can be implemented in digital electronic circuitry, or in computer hardware, firmware, software, or in combinations of them. For example, each of the method steps of deriving characteristic features from holographic data or differentiating microscopic particles may be implemented in the processor. Thus, while a processor as such is prior art, a system that includes the instructions for deriving characteristic features from holographic data or differentiating microscopic particles is not prior art.

An example also includes a computer program product which provides the functionality of any of the example methods when executed on a computing device. Vice versa, the computer program products described above may be implemented as hardware in computing devices. Alternatively, an example of the computer program products may be implemented as computer-implemented methods and, therefore, also relates to the corresponding computer-implemented methods.

Another aspect relates to a data carrier for carrying a computer program product as described above. Such a data carrier may comprise a computer program product tangibly embodied thereon and may carry machine-readable code for execution by a programmable processor. An example relates to a carrier medium carrying a computer program product that, when executed on a computing device, provides instructions for executing any of the methods as described above. The term "carrier medium" refers to any medium that participates in providing instructions to a processor for execution. Such a medium may take many forms, including but not limited to, non-volatile media, and transmission media. Non-volatile media includes, for example, optical or magnetic disks, such as a storage device which is part of mass storage. Common forms of computer-readable media include a CD-ROM, a DVD, a flexible disk or floppy disk, a tape, a memory chip or cartridge, or any other medium from which a computer can read. Various forms of computer-readable media may be involved in carrying one or more sequences of one or more instructions to a processor for execution. The computer program product can also be transmitted via a carrier wave in a network, such as a LAN, a WAN, or the Internet. Transmission media can take the form of acoustic or light waves, such as those generated during radio wave and infrared data communications.

TABLE A

Confusion matrix (using reconstruction) after 10-fold cross validation, wherein each time 10% of the data is used as a test set.

|        | Gran | Mono | T-cell | Total |
|--------|------|------|--------|-------|
| Gran   | 7338 | 685  | 2      | 8025  |
| Mono   | 581  | 8194 | 55     | 8830  |
| T-cell | 5    | 57   | 1593   | 1655  |

TABLE B

Confusion matrix using all Zernike moments (up to order n = 6) after 10-fold cross validation, wherein each time 10% of the data is used as a test set.

|        | Gran | Mono | T-cell | Total |
|--------|------|------|--------|-------|
| Gran   | 7723 | 300  | 2      | 8025  |
| Mono   | 650  | 8167 | 13     | 8830  |
| T-cell | 0    | 4    | 1651   | 1655  |

TABLE C

Confusion matrix using all Zernike moments (up to order n = 22) after 10-fold cross validation, wherein each time 10% of the data is used as a test set.

|        | Gran | Mono | T-cell | Total |
|--------|------|------|--------|-------|
| Gran   | 7821 | 204  | 0      | 8025  |
| Mono   | 369  | 8455 | 6      | 8830  |
| T-cell | 1    | 7    | 1647   | 1655  |

TABLE D

Confusion matrix using a reduced set of 10 Zernike moments (up to order n = 22) after 10-fold cross validation, wherein each time 10% of the data is used as a test set.

|        | Gran | Mono | T-cell | Total |
|--------|------|------|--------|-------|
| Gran   | 7823 | 200  | 2      | 8025  |
| Mono   | 362  | 8462 | 6      | 8830  |
| T-cell | 0    | 6    | 1649   | 1655  |

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

The invention claimed is:

1. A differentiation system for differentiating microscopic particles, the system comprising:
an input device configured to receive an interference pattern representative of a microscopic particle in suspension, the interference pattern corresponding to holographic images acquired with a digital in-line holographic microscope from the microscopic particle in suspension, wherein the digital in-line holographic microscope is configured to capture depth information during acquisition of the interference pattern;
holographic image data processing logic configured to derive a Fourier spectrum of the interference pattern by performing a Fourier transform; and
a microscopic particle recognizer configured to determine characterization features from the Fourier spectrum of the interference pattern for characterization of the microscopic particle, wherein the characterization features include rotationally invariant features.

2. The differentiation system according to claim 1, wherein the microscopic particle recognizer is configured to apply a single implementation of the Fourier transform to the received interference pattern.

3. The differentiation system according to claim 1, wherein differentiation is performed on individual cells.

4. The differentiation system according to claim 1, wherein the holographic image data processing logic is configured to pre-process the interference pattern for data reduction in both spatial and frequency domains.

5. The differentiation system according to claim 4, wherein the holographic image data processing logic is configured to resize or crop the interference pattern around a center portion of the illuminated area.

6. The differentiation system according to claim 1, wherein the holographic image data processing logic is configured to take an absolute value of the Fourier transform of the interference pattern.

7. The differentiation system according to claim 1, wherein the rotationally invariant features comprise Zernike moments up to order 6 or wherein the rotationally invariant features comprise Zernike moments up to order 22.

8. The differentiation system according to claim 1,
wherein the microscopic particle recognizer is configured to determine rotationally invariant features according to:

$$F_n = \left| \sum_{x,y} M_n(x, y) f(x, y) \right|$$

wherein f(x, y) represents a (resealed) absolute value of the Fourier transform of the interference pattern, for $x^2+y^2 \leq 1$ and $M_n(x, y)$ for arbitrary $n \in N$ are moments with rotational symmetry, expressed in cartesian coordinates, or wherein the microscopic particle recognize r is configured to determine rotationally invariant features comprising Zernike moments given by $V_{n,m}(\rho, \theta) = R_{n,m} \exp(jm\theta)$, expressed in polar coordinates so that $\theta$ is an azimuthal angle, $\rho$ is a radial distance $0 \leq \rho \leq 1$, and j is an imaginary unit, n are non-negative integers representing order of Zernike polynomials and m represents repetitions of the Zernike polynomials which satisfy the constraint of $$\frac{(n-|m|)}{2}$$

$\in N$, $|m| \leq n$, and $R_{n,m}$ are radial polynomials $$R_{n,m} = \sum_{s=0}^{(n-|m|)/2} (-1)^s \frac{(n-s)!}{s!\left(\frac{n+|m|}{e}s\right)!\left(\frac{n-|m|}{2}s\right)!} \rho^{(n-2s)}.$$

9. The differentiation system according to claim 1, further comprising a microscopic particle classifier configured to classify the microscopic particles based on the determined features of the microscopic particles using the microscopic particle recognizer.

10. The differentiation system according to claim 9, wherein the microscopic particle recognizer corresponds to a cell recognizer and the microscopic particle classifier corresponds to a cell classifier configured to classify white blood cells as one of: a T-lymphocyte, a granulocyte, or a monocyte based on features of the white blood cell determined using the cell recognizer.

11. The differentiation system according to claim 1, wherein the input device comprises a holographic image data acquisition system for acquiring the interference pattern of the microscopic particle in suspension.

12. The differentiation system according to claim 1, wherein the holographic image data processing logic is configured to remove a background from the interference pattern.

13. A diagnostic device comprising a differentiation system according to claim 1, for analyzing white blood cells.

14. A method for differentiating microscopic particles, the method comprising:
receiving an interference pattern representative of a microscopic particle in suspension, the interference pattern corresponding to holographic images captured with a digital in-line holographic microscope and comprising depth information during acquisition of the interference pattern,
deriving a Fourier spectrum of the interference pattern by performing a Fourier transform,
and determining characterization features from the Fourier spectrum of the interference pattern for characterization of the microscopic particles, the characterization features comprising rotationally invariant features.

15. The method according to claim 14, identifying whether a cell is a white blood cell or a malignant/cancerous cell based on the determined characterization features.

16. The method according to claim 15, further comprising identifying whether the microscopic particle is one of: a T-lymphocyte, a granulocyte, or a monocyte based on the determined characterization features.

* * * * *